Figure 1:
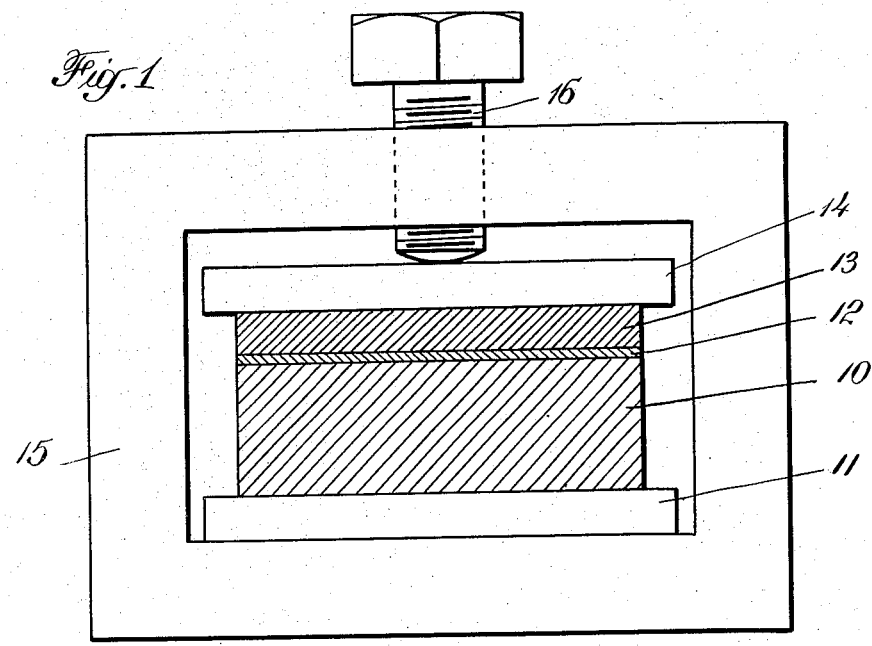

March 26, 1940.   M. LINCOLN   2,195,314

METHOD OF UNITING METAL OBJECTS

Filed Aug. 25, 1938

INVENTOR
Marie Lincoln
BY
ATTORNEYS

Patented Mar. 26, 1940

2,195,314

UNITED STATES PATENT OFFICE 2,195,314

METHOD OF UNITING METAL OBJECTS

Mark Lincoln, Newark, N. J., assignor to The H. A. Wilson Company, Newark, N. J., a corporation of New Jersey Application August 25, 1938, Serial No. 226,741

7 Claims. (Cl. 113—112)

This invention relates to the art of uniting metal objects, and is concerned more particularly with a novel method for effecting the union of a pair of metal objects, which is superior in numerous respects to both soldering and direct welding processes as ordinarily carried on. By the practice of the new method, a uniform joint can be obtained, the presence of a base metal in the plane of the union may be substantially avoided, and the temperatures required are lower than those employed in direct welding operations. The method of the invention may be used for various purposes, but since it is especially suited for the production of composite bars consisting of a silver facing and a backing of a non-ferrous base metal or alloy, the application of the new method to that use will be illustrated and described in detail for purposes of explanation. It is to be understood, however, and will be at once apparent that the utility of the invention is not limited to making the specific product referred to.

For many purposes, as for example, in the production of electrical contacts, composite sheets consisting of a facing of silver and a backing of copper or nickel are employed, and in such sheets, it is highly important that the silver facing be free of contamination by base metals. Heretofore, such sheets have commonly been made by securing a layer of silver to a layer of the backing material, either by soldering or by direct welding, to produce a bar which is then rolled down to the final sheet thickness. When the facing and backing layers are secured together by the use of ordinary silver solders, which contain silver and such other ingredients as cadmium, zinc, copper, etc., some of these base metal constituents of the solder may enter the facing layer during the soldering operation so that in the final sheet or in contacts or other objects made therefrom, the silver layer is contaminated. Such contamination can be avoided by securing the two layers together by direct welding, but this requires the use of a relatively high temperature which has a detrimental effect on the grain structure of the silver facing so that blisters and other imperfections develop which impair the quality of the final product. Also, with direct welding, the cost of the final product is relatively high because of the high temperature required and because the size of the composite bars from which the sheets are rolled is limited.

According to the new method, a thin sheet containing a preponderance of gold or silver, preferably the latter, and a much less amount of cadmium is placed between the objects to be united, and the objects with the sheet between are then subjected to heat and pressure. As these operations proceed, it is found that the cadmium present in the sheet has the property of bleeding and volatilizing out of the sheet, running down the side of the lower object, whence it can be readily removed after the union is effected, and also going off in vapor form. When this procedure is properly carried on, little or no cadmium remains in the joint, and there is, therefore, only a thin layer of the remaining constituent of the sheet and substantially no base metal between the objects. If one of the objects to be united is silver and the sheet used is a cadmium-silver alloy, the silver in the sheet unites with that of the object and the joint is indicated only by a thin film of an alloy of silver and the metal, of which the other object is made, in the plane of union. In making joints in this manner between a silver facing and a backing of base metal, contamination of the facing may be avoided, and this is a matter of considerable importance in preparing composite sheets for certain purposes.

Figure 2:
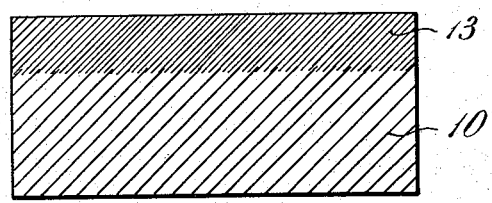

For a better understanding of the invention, reference may be had to the accompanying drawing, in which Figure 1 is a view in side elevation of a clamping device used in practicing the process of the invention, with the objects to be united in place therein, and Figure 2 is a transverse sectional view through the plane of union of two objects secured together by the new process.

In practicing the invention to secure a facing to a backing, the backing 10 is placed upon a suitable pressure plate 11, which may be of steel, the surface of the backing at which the union is to take place having first been suitably cleaned. A thin sheet 12 of an alloy of silver or gold and cadmium is then placed on the top surface of the backing and upon this is laid the facing 13, the surface thereof which is to lie in contact with the sheet having first been cleaned. Over the facing is placed a second pressure plate 14, and the stack of plates is then placed in a clamping device 15, which consists of a suitable open center frame, through one leg of which projects a screw 16. When the stack is in position in the frame, the screw is turned down to place the plates under substantial pressure, and the clamp with the parts in position is then introduced into a furnace where the temperature can be raised to the desired degree.

In the furnace, as the temperature is raised, the cadmium begins to leave the sheet 12, running down the side of the backing and also volatilizing. This escape of the cadmium appears to start at a temperature varying with the amount of cadmium present in the sheet, and with a sheet containing 83% silver and 17% cadmium, for example, the loss of the cadmium occurs at about 1550° F. The temperature in the furnace is raised beyond this point to effect the desired union as, for example, to about 1625° F., in the case mentioned. As the heating continues with the temperature slowly rising, substantially the entire cadmium content of the sheet appears to be driven off, and the remaining constituent in the sheet becomes soft and assumes a condition which enables it to adhere to the backing and to the facing. After the heating operation has been completed, the clamp with the parts in place is removed from the furnace and the composite bar is ready for rolling.

The sheet used for securing the two objects together contains only cadmium and silver or gold, and it may vary from .003" to .010" in thickness, a sheet .007" thick being suitable for most purposes. In the sheet, the silver or gold varies in amount from about 83% to about 92%, with the remainder cadmium, and excellent results have been obtained with a sheet containing 17% cadmium and 83% silver, and with a sheet containing 12% to 14% cadmium and the remainder gold. The composition of the sheet will depend on the objects to be united, and a silver-cadmium sheet is preferred and may be used in most instances, since silver will wet and adhere to most metals. However, silver does not readily adhere to ferrous metals, so that if one of the objects, for instance, the backing, is made of a ferrous metal, a gold-cadmium sheet is used.

Numerous examples of the use of the new method may be given, such as the production of composite blocks or sheets consisting of a facing of fine silver or sterling silver and a backing of copper, brass, nickel, or German silver, for use in the manufacture of electrical contacts. A facing of fine gold may be applied to a backing of nickel by the method, and layers of gold, silver, and platinum may be secured together for dental purposes or in the manufacture of jewelry.

With the new method used in applying a facing of a noble metal, such as fine silver, to a backing, contamination of the facing by impurities may be avoided, and, as a much lower temperature is used than in direct welding operations, the grain structure and quality of such a silver facing is unimpaired. As a result, the composite bar may be rolled down to produce an extremely thin facing of pure metal. Thus, it has been possible by the use of the method to produce a facing of silver as thin as .0002" which shows no discoloration of the backing therethrough. The new method, thus, offers distinct advantages over both soldering and direct welding, as ordinarily practiced in the application of silver and similar facings to objects of other metals or their alloys.

I claim:

1. A method of uniting a pair of metallic objects which comprises assembling the objects with the surfaces to be united in contact with opposite faces of a sheet of an alloy containing a preponderance of a metal selected from the class consisting of gold and silver and the remainder cadmium, and subjecting the objects to heat and pressure until the cadmium has substantially entirely escaped from the sheet and the remaining constituent thereof has adhered to the surfaces of the objects, the amount of heat applied to the objects being insufficient to raise them to the melting point of the remaining constituent of the sheet.

2. A method of uniting a pair of metallic objects which comprises assembling the objects with the surfaces to be united in contact with opposite faces of a sheet of an alloy containing from about 83% to about 92% of a metal selected from the class consisting of gold and silver and the remainder cadmium, and subjecting the objects to heat and pressure until the cadmium has substantially entirely escaped from the sheet and the remaining constituent thereof has adhered to the surfaces of the objects, the amount of heat applied to the objects being insufficient to raise them to the melting point of the remaining constituent of the sheet.

3. A method of uniting a pair of metallic objects which comprises assembling the objects with the surfaces to be united in contact with opposite faces of a sheet of an alloy containing from about 83% to about 92% of a metal selected from the class consisting of gold and silver and the remainder cadmium, the sheet being from about .003" to about .010" thick, and subjecting the objects to heat and pressure until the cadmium has substantially entirely escaped from the sheet and the remaining constituent thereof has adhered to the surfaces of the objects, the amount of heat applied to the objects being insufficient to raise them to the melting point of the remaining constituent of the sheet.

4. A method of uniting a facing layer of silver to a backing layer of a non-ferrous metal or alloy which comprises assembling the layers with a sheet between them containing from about 83% to about 92% silver and the remainder cadmium, and subjecting the layers and sheet to heat and pressure until the cadmium has substantially entirely escaped from the sheet and the silver of the sheet has adhered to said layers, the amount of heat applied to the layers being insufficient to raise them to the melting point of the silver of the sheet.

5. A method of uniting silver to another metallic object which comprises assembling the objects with the surfaces to be united in contact with opposite faces of a sheet of an alloy containing a preponderance of a metal selected from the class consisting of gold and silver and the remainder cadmium, and subjecting the objects to heat and pressure until the cadmium has substantially entirely escaped from the sheet and the remaining constituent thereof has adhered to the surfaces of the objects.

6. A method of uniting silver to another metallic object which comprises assembling the objects with the surfaces to be united in contact with opposite faces of a sheet of an alloy containing from about 83% to about 92% of a metal selected from the class consisting of gold and silver and the remainder cadmium, and subjecting the objects to heat and pressure until the cadmium has substantially entirely escaped from the sheet and the remaining constituent thereof has adhered to the surfaces of the objects.

7. A method of uniting silver to another metallic object which comprises assembling the objects with the surfaces to be united in contact with opposite faces of a sheet of an alloy containing from about 83% to about 92% of a metal selected from the class consisting of gold and silver and the remainder cadmium, the sheet being from about .003" to about .010" thick, and subjecting the objects to heat and pressure until the cadmium has substantially entirely escaped from the sheet and the remaining constituent thereof has adhered to the surfaces of the objects.

MARK LINCOLN.